United States Patent [19]

Andersson

[11] Patent Number: 4,751,877
[45] Date of Patent: Jun. 21, 1988

[54] DEVICE FOR CONVEYING PASTRY OR THE LIKE THROUGH A HEATING ZONE

[75] Inventor: Kurt G. I. Andersson, Arlöv, Sweden
[73] Assignee: Austria Metall Aktiengesellschaft, Braunau, Austria
[21] Appl. No.: 421,244
[22] Filed: Sep. 22, 1982
[30] Foreign Application Priority Data
  Mar. 8, 1982 [SE] Sweden .................................. 8201409
[51] Int. Cl.4 ............................................. A47J 27/00
[52] U.S. Cl. ..................................... 99/443 C; 198/820
[58] Field of Search ....................... 99/352, 386, 443 R, 99/443 C; 198/820, 821, 818, 819

[56] References Cited

U.S. PATENT DOCUMENTS

| | | | |
|---|---|---|---|
| 381,456 | 4/1888 | Woodbury | 198/821 |
| 927,648 | 7/1909 | Gates | 198/821 |
| 1,974,129 | 9/1934 | Wasson | 198/820 X |
| 2,858,237 | 10/1958 | Walles et al. | 99/443 C X |
| 3,633,428 | 1/1972 | Pott | 198/820 X |
| 3,993,185 | 11/1976 | Fleckenstein et al. | 198/818 X |
| 4,204,466 | 5/1980 | Schnee | 99/352 X |

FOREIGN PATENT DOCUMENTS 1070992 12/1959 Fed. Rep. of Germany ...... 198/821

Primary Examiner—Harvey C. Hornsby
Assistant Examiner—Frankie L. Stinson
Attorney, Agent, or Firm—Karl F. Ross; Herbert Dubno

[57] ABSTRACT

A device for conveying pieces of dough through a fermentation chamber and/or a baking oven comprises a metallic transport band with upstanding lateral ribs of elastomeric material, especially silicon rubber, each having a continuous external groove of a depth approximating half the thickness of the rib which facilitates the fastening of the rib to the band and allows the rib to flex outward on passing around end rollers supporting the band. The band may also be provided with spaced-apart wooden flights bridging the space between the ribs for entraining the goods to be treated.

6 Claims, 1 Drawing Sheet

DEVICE FOR CONVEYING PASTRY OR THE LIKE THROUGH A HEATING ZONE

FIELD OF THE INVENTION

My present invention relates to a device for conveying pieces of dough, designed to form pastry and other bakery goods, through a treatment zone such as a fermentation chamber and/or a baking oven in which they are subjected to an elevated temperature.

BACKGROUND OF THE INVENTION

Conventional devices of this character comprise an endless band, perforated or not, on which the pieces of dough to be treated are deposited—usually in longitudinal rows—at an inlet end and from which they are removed at an outlet end. To hold these pieces in position between the two ends, at which the band is led around respective rollers, the band may be successively fitted at the inlet with lateral stops of limited length that are coupled together to form two parallel barriers between which the dough is confined. On arriving at the outlet, each strip is detached from the band and returned to the inlet end for reassembly. In order to entrain the pieces, the band is further equipped at its outer surface with longitudinally separated transverse flights which may also be temporarily coupled with the barrier-forming strips. Both the strips and the flights are usually made of steel-wire-reinforced wood which is known to avoid the risk of scorching of adjoining dough pieces upon passage through a high-temperature zone.

This type of arrangement, with its discontinuous mode of operation, is cumbersome and prevents an automated handling of the goods to be conveyed.

Test made with strips of polytetrafluoroethylene, mounted on hollow steel profiles for the circulation of cooling water, have shown this material to be less satisfactory than wood as far as the prevention of scorching is concerned.

OBJECT OF THE INVENTION

The object of my present invention is to provide an improved device of this nature which obviates the aforedescribed drawbacks and enables a continuous treatment of bakery goods or the like in a heating zone through which they are driven in a continuous manner and preferably at constant speed.

SUMMARY OF THE INVENTION

I realize this object, in accordance with my present invention, by providing the transport band with two endless lateral ribs of elastomeric material extending along its respective longitudinal edges, each rib having a continuous groove which parallels the band and faces the respective edge thereof. Such a groove facilitates an outward flexing of the rib upon its passage around either end roller and also provides a convenient location for fasteners serving to connect the rib with the band.

The groove, which may be of rectangular cross-section approaching a square, preferably has a depth on the order of half the rib thickness. The rib configuration is the subject matter of my Swedish design application No. 82-0536, filed Sept. 8, 1981, and of my corresponding U.S. design-patent application Ser. No. 415,159 filed Sept. 7, 1982. A particularly advantageous material for the ribs, from the viewpoint of mechanical strength, flexibility and low heat conduction, is a silicon rubber.

The transport band, which should be imperforate especially when the treatment zone includes a fermentation chamber, preferably consists of sheet metal such as carbon steel.

BRIEF DESCRIPTION OF THE DRAWING

The above and other features of my invention will now be described in detail with reference to the accompanying drawing in which.

SPECIFIC DESCRIPTION

Figure 3:
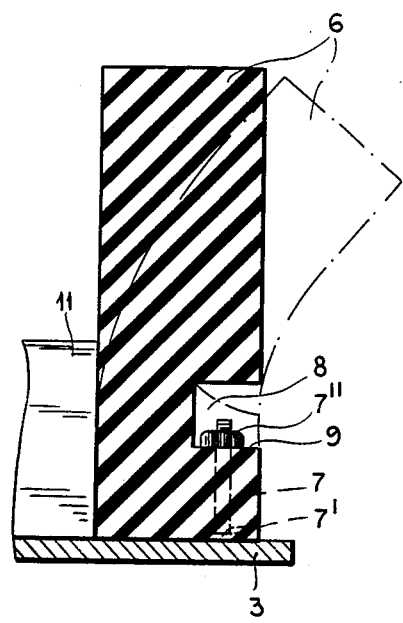
FIG. 3 is a cross-sectional view taken on the line III—III of FIG. 2.

The assembly shown in FIG. 1 comprises a transport band 3 with two horizontal stretches, more fully described hereinafter with reference to FIGS. 2 and 3, which is led around end rollers 4 and 5 (at least one of them driven by nonillustrated means) and has an upper run successively traversing a fermentation chamber 1 and a baking oven 2 in cascade with each other. The band, bounded along each edge by an elastically deformable continuous rib 6 of substantially rectangular cross-section rising from its outer surface, is slidably supported in the treatment zone 1, 2 by a cast-iron base 10.

Figure 2:
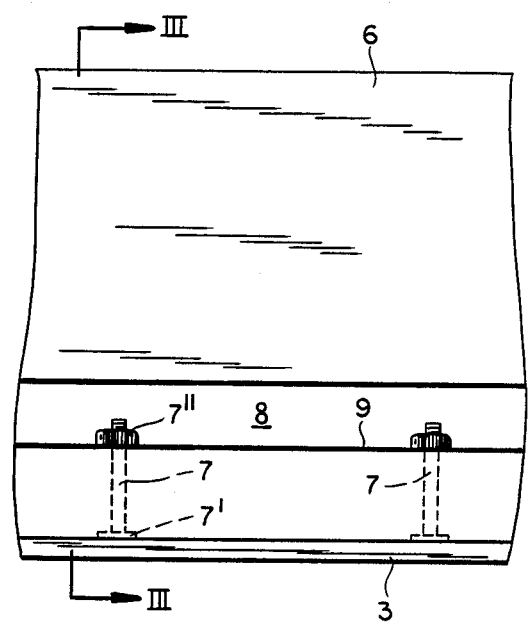
FIG. 2 is a fragmentary side view of the upper run of a transport band according to my invention, drawn to a larger scale.

FIGS. 2 show details of the band 3, preferably consisting of solid carbon steel, and one of its edge ribs 6. The latter is made of silicone rubber, e.g. of the type designated SIS 162680/68601, and has a continuous external groove 8 of roughly square cross-section disposed in the lower third of its height which approximately is three times its thickness. Groove 8, whose upper wall is spaced from the band 3 by a distance corresponding to about that thickness, has a depth and a height almost equal to half the same thickness. The lower wall flat bottom 9 of the groove forms a convenient bearing surface for nuts 7" threaded onto a multiplicity of peripherally spaced-apart screws 7 (only one shown) by which the rib 6 is fastened to the band 3, the screws having heads 7' spot-welded to the band. Also shown in FIG. 3 is one of several flights 11, which may consist in the usual manner of wood reinforced by steel wires, extending between the illustrated rib 6 and its nonillustrated mate.

Figure 1:
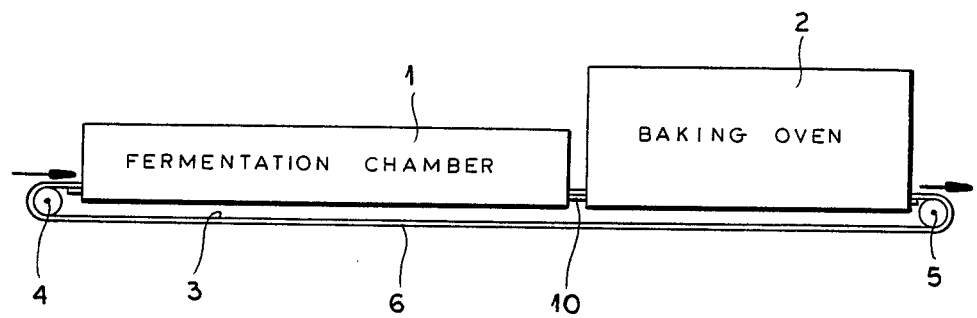
FIG. 1 is a diagrammatic side-elevational view of an installation for the treatment of bakery goods in accordance with my invention.

In operation, the presence of groove 8 enables rib 6 to flex outward from its normal vertical position—as indicated in phantom lines in FIG. 3—as it passes around one of the end rollers 4, 5 shown in FIG. 1 so as to foreshorten its effective height; this deformation significantly lowers the stress to which the elastomeric rib material is subjected during such passage. Despite that deformation, loaves of bread or other bakery goods still remain well confined on the upper conveyor surface while passing from the inlet end above roller 4 to the outlet end above roller 5.

Elastomeric materials other than silicone rubbers may be used, especially under less exacting requirements, for the conveyance of goods through a treatment zone by a device as described as shown in the drawing.

I claim:

1. A device for conveying pieces of dough through a treatment zone, comprising an endless transport band with two horizontal upper and lower stretches led about end rollers, said band having an outer surface provided with two continuous endless lateral ribs of elastomeric material extending vertically in said stretches along respective longitudinal edges thereof, each of said ribs having a continuous external groove of substantially rectangular cross-section and with a flat bottom surface paralleling said band and facing the respective longitudinal edge for facilitating an outward flexing of the rib upon passage around either of said end rollers, each of said ribs being fastened to said band by a multiplicity of screws anchored to said band and penetrating a portion of the rib lying between said band and said groove, said screws carrying out nuts lodged in said groove and bearing upon said flat bottom surface thereof.

2. A device as defined in claim 1 wherein each groove has a depth on the order of half the thickness of said ribs and lies in a half of the respective rib adjoining said band.

3. A device as defined in claim 1, or 2 wherein said elastomeric material is a silicone rubber.

4. A device as defined in claim 3 wherein said band consists of sheet steel.

5. A device as defined in claim 4 wherein said ribs are bridged by transverse flights spacedly disposed on the outer surface of said band for entraining the pieces of dough to be conveyed in the upper stretch.

6. A device as defined in claim 5 wherein said treatment zone comprises a fermentation chamber and a baking oven in cascade.

* * * * *